United States Patent

Benazzi et al.

[11] Patent Number: 5,989,410
[45] Date of Patent: Nov. 23, 1999

[54] PROCESS FOR IMPROVING THE POUR POINT OF PARAFFIN FEEDSTOCKS WITH A CATALYST CONTAINING AN IM-5 ZEOLITE BASE

[75] Inventors: Eric Benazzi, Chatou; Nathalie George-Marchal, Paris; Christophe Gueret; Patrick Briot, both of Vienne; Alain Billon, Le Vesinet; Pierre Marion, Paris, all of France

[73] Assignee: Institut Francais du Petrole, Rueil-Malmaison, France

[21] Appl. No.: 09/172,757

[22] Filed: Oct. 15, 1998

[30] Foreign Application Priority Data

Oct. 16, 1997 [FR] France ................... 97 12944

[51] Int. Cl.⁶ .................. C10G 35/06; C10G 35/085; C10G 35/095; C10G 47/12
[52] U.S. Cl. .................. 208/134; 208/135; 208/136; 208/137; 208/143; 208/144; 208/145; 208/111.35; 208/111.1; 208/109; 208/111.01; 208/27
[58] Field of Search ................. 208/134, 135, 208/136, 137, 27, 109, 111.01, 111.1, 111.35, 143, 144, 145

[56] References Cited

U.S. PATENT DOCUMENTS 4,474,618 10/1984 Yen et al. ................. 208/111

FOREIGN PATENT DOCUMENTS 0 135 658  4/1985  European Pat. Off. .
2 754 809  4/1998  France .

*Primary Examiner*—Walter D. Griffin
*Assistant Examiner*—Nadine Preisch
*Attorney, Agent, or Firm*—Millen, White, Zelano & Branigan

[57] ABSTRACT

The invention relates to a process for improving the pour point of a feedstock that comprises paraffins of more than 10 carbon atoms, in which the feedstock that is to be treated is brought into contact with a catalyst that comprises the IM-5 zeolite and at least one hydro-dehydrogenating element, at a temperature of between 170 and 500° C., a pressure of between 1 and 250 bar, and an hourly volume velocity of between 0.05 and 100 $h^{-1}$, in the presence of hydrogen at a ratio of 50 to 2000 l/l of feedstock. The oils that are obtained have good pour points and high viscosity indices (VI). The process can also be applied to gas-oils and other feedstocks whose pour points need to be lowered.

14 Claims, 2 Drawing Sheets

PROCESS FOR IMPROVING THE POUR POINT OF PARAFFIN FEEDSTOCKS WITH A CATALYST CONTAINING AN IM-5 ZEOLITE BASE

This invention relates to a process for improving the pour point of feedstocks that contain linear and/or slightly branched, long (more than 10 carbon atoms) paraffins, in particular for converting, with good yield, feedstocks that have high pour points into at least one fraction that has a low pour point and a high viscosity index.

PRIOR ART

High-quality lubricants are of vital importance for the proper operation of modern machines, automobiles, and trucks. The amount of paraffins that come directly from petroleum and that are untreated and have suitable properties for constituting good lubricants is very small, however, compared to the rising demand in this sector.

It is necessary to treat heavy petroleum fractions with high contents of linear or slightly branched paraffins to obtain oils with a good quality base with the best yields possible, by an operation whose purpose is to eliminate the linear or very slightly branched paraffins in feedstocks, which will then be used as basic oils or as kerosene or jet fuel.

Actually, the paraffins of high molecular weight that are linear or very slightly branched and are present in oils or in kerosene or jet fuel lead to high pour points and therefore to solidification phenomena for applications at low temperature. To lower the pour point values, these linear paraffins that are not branched or are very slightly branched should be partially or completely eliminated.

This operation can be carried out by extraction using solvents such as propane or methyl-ethyl ketone; we then speak of dewaxing with propane or with methyl ethyl ketone (MEK). These techniques are, however, expensive, time-consuming, and not always easy to use.

Another means is catalytic treatment, and, taking into account their shape selectivity, zeolites are among the most commonly used catalysts.

Catalysts with a zeolite base, such as ZSM-5, ZSM-11 ZSM-12, ZSM-22, ZSM-23, ZSM-35, and ZSM-38 have been described for use in these processes.

The applicant has applied his research efforts to the development of catalysts for improving the pour points of feedstocks.

OBJECT OF THE INVENTION

The invention has as its object a process for improving the pour point of a paraffinic feedstock that comprises paraffins with more than 10 carbon atoms, in which the feedstock that is to be treated is brought into contact with a catalyst that has an IM-5 zeolite base and that comprises at least one hydro-dehydrogenating element at a temperature of between 170 and 500° C., a pressure of between 1 and 250 bar, and an hourly volume velocity of between 0.05 and 100 $h^{-1}$, in the presence of hydrogen at a ratio of 50 to 2000 l/l of feedstock.

The IM-5 zeolite, in hydrogen form, which is referred to as H-IM-5 and is obtained by calcination and/or ion exchanges of the coarse synthesis IM-5 zeolite, which is used in the process according to the invention, and its mode of synthesis are described in Patent Application FR-96/12, 873 of Oct. 21, 1996.

The zeolitic structure, named IM-5, has a chemical composition that is expressed in an anhydrous base, in terms of oxide molar ratios, by the formula:

$$100 \, XO_2, \, m \, Y_2O_3, \, p \, R_{2/n}O,$$

where m is equal to or less than 10, p is between 0 (exclusive) and 20,

R represents one or more cations of valence n,

X is silicon and/or germanium, preferably silicon,

Y is selected from the group that is formed by the following elements: aluminum, iron, gallium, boron, titanium, preferably Y is aluminum, and characterized by the fact that it presents, for the Zeolite IM-5 as prepared, an X-ray diffraction diagram that comprises the lines that are presented in Table I.

TABLE 1

X-Ray Diffraction Table of the Zeolite IM-5 as prepared

| $D_{bk1}$ (A) | $I/I_{max}$ |
|---|---|
| 11.8 ± 0.35 | F to TF(1) |
| 11.5 ± 0.30 | F to TF(1) |
| 11.25 ± 0.30 | F to TF(1) |
| 9.95 ± 0.20 | m to F |
| 9.50 ± 0.15 | m to F |
| 7.08 ± 0.12 | f to m |
| 6.04 ± 0.10 | tf to f |
| 5.75 ± 0.10 | f |
| 5.65 ± 0.10 | f |
| 5.50 ± 0.10 | tf |
| 5.35 ± 0.10 | tf |
| 5.03 ± 0.09 | tf |
| 4.72 ± 0.08 | f to m |
| 4.55 ± 0.07 | f |
| 4.26 ± 0.07 | tf |
| 3.92 ± 0.07 | F to TF(2) |
| 3.94 ± 0.07 | TF(2) |
| 3.85 ± 0.05 | TF(2) |
| 3.78 ± 0.04 | F to TF(2) |
| 3.67 ± 0.04 | m to F |
| 3.55 ± 0.03 | m to F |
| 3.37 ± 0.02 | f |
| 3.30 ± 0.015 | f |
| 3.099 ± 0.012 | f to m |
| 2.970 ± 0.007 | tf to f |
| 2.815 ± 0.005 | tf |
| 2.720 ± 0.005 | tf |

(1)Lines that are part of the same solid mass,
(2)Lines that are part of the same solid mass.

The IM-5 zeolite in its hydrogen form, referred to as H-IM-5, which is obtained by calcination(s) and/or ion exchange(s), as explained below, has an X-ray diffraction diagram that comprises the lines that are presented in Table 2.

TABLE 2

X-Ray Diffraction Table of the IM-5 Zeolite in H-Form, H-IM-5 Obtained by Calcination

| $D_{bk1}$ (A) | $I/I_{max}$ |
|---|---|
| 11.8 ± 0.30 | F to TF(1) |
| 11.45 ± 0.25 | TF(1) |
| 11.20 ± 0.20 | F to TF(1) |
| 9.90 ± 0.15 | m to F |
| 9.50 ± 0.15 | m to F |
| 7.06 ± 0.12 | f to m |
| 6.01 ± 0.10 | tf to f |
| 5.70 ± 0.10 | f |
| 5.30 ± 0.10 | tf |
| 5.03 ± 0.09 | tf |
| 4.71 ± 0.08 | f |
| 4.25 ± 0.07 | tf |
| 3.87 ± 0.07 | m to F(2) |

TABLE 2-continued

X-Ray Diffraction Table of the IM-5 Zeolite in H-Form,
H-IM-5 Obtained by Calcination

| $D_{bkl}$ (A) | $I/I_{max}$ |
|---|---|
| 3.81 ± 0.05 | m to F(2) |
| 3.76 ± 0.04 | m to F(2) |
| 3.67 ± 0.04 | f to m |
| 3.54 ± 0.04 | m to F |
| 3.37 ± 0.03 | f |
| 3.316 ± 0.015 | f |
| 3.103 ± 0.012 | f |
| 3.080 ± 0.010 | f to m |
| 2.950 ± 0.010 | tf to f |
| 2.880 ± 0.007 | tf |
| 2.790 ± 0.005 | tf |
| 2.590 ± 0.005 | tf |

(1)Lines that are part of the same solid mass,
(2)Lines that are part of the same solid mass.

These diagrams are obtained with the aid of a diffractometer by using the standard powder method with the K radiation of copper. Starting from the locations of the diffraction peaks that are shown by angle 2, the reticulate eqidistances $d_{hkl}$ that are characteristic of the sample are calculated by the Bragg equation. The calculation of intensity is done on the basis of a relative intensity scale on which the line that exhibits the strongest intensity on the X-ray diffraction diagram is given a value of 100;

tres faible (tf) [very low] means less than 10, faible (f) [low] means less than 20, moyenne (m) [medium] means between 20 and 40, forte (F) [strong] means between 40 and 60, trés forte (TF) [very strong] means greater than 60.

The X-ray diffractograms from which these data have been obtained (spacing d and relative intensities) are characterized by broad reflections with numerous peaks that form shoulders on other peaks of high intensity. It may happen that some or all of the shoulders are not resolved. This can occur for slightly crystalline samples or samples within which the crystals are small enough to provide a significant broadening of the X-rays. This may also be the case when the equipment or the conditions that are used to obtain the diagram are different from those that are used here.

It is believed that the IM-5 zeolite has a new basic structure or topology that is characterized by its X-ray diffraction diagram. The IM-5 zeolite in its "coarse synthesis form" has approximately the characteristics that are obtained by X-ray diffraction with those that are exhibited in Table 1 and thus are distinguished from known zeolites. The object of the intention also comprises any zeolite of the same structural type as that of the IM-5 zeolite.

In this text, the "IM-5 zeolite" will also include IM-5 zeolites that include silicon and at least one element T that is selected from the group that is formed by Al, Fe, Ga, B, Ti, Zr.

Advantageously, this process makes it possible to convert a feedstock that has a high pour point into a mixture (oil) that has a lower pour point and a high viscosity index. It can also be used to lower the pour points of gas-oils, for example.

The feedstock is composed of, i.a., linear and/or slightly branched paraffins that comprise at least 10 carbon atoms, preferably 15 to 50 carbon atoms, and advantageously 15 to 40 carbon atoms.

The catalyst comprises at least one hydro-dehydrogenating function, for example a metal of group VIII or a combination of at least one metal or compound of group VIII and at least one metal or compound of group VI, and the reaction is carried out under the conditions that are described below.

The use of the XM-5 zeolite according to the invention under the conditions that are described above makes it possible, in particular, to produce products with a low pour point and a high viscosity index with good yield.

DETAILED DESCRIPTION OF THE INVENTION

The IM-5 zeolite has an Si/T atomic ratio of between 5 and 600 and in particular between 10 and 300.

The overall Si/T ratio of the zeolite and the chemical composition of the samples are determined by X-fluorescence and atomic absorption.

The IM-5 zeolite according to the invention can be obtained, with the desired Si/T ratio, for catalytic application according to the invention directly to synthesis by adjusting the operating conditions of synthesis. Then, the zeolite is calcined and exchanged by at least one treatment with a solution of at least one ammonium salt in order to obtain the ammonium form of the zeolite which, once calcined, leads to a hydrogen form of the zeolite.

In other cases, it is optionally possible for the IM-5 zeolite to undergo a dealuminification treatment that is designed to raise a low S/Al ratio that was obtained in synthesis, or any treatment that makes it possible to remove at least a portion of element T that is contained in the IM-5 zeolite, whereby T is Al, Fe, Ga, B, Ti, Zr.

To prepare dealuminificated IM-5 zeolite according to the invention, in the preferred case where T is Al, two dealuminification methods can be used, from the coarse IM-5 zeolite of synthesis that comprises the organic template. They are described below. Any other method that is known to one skilled in the art, however, also falls within the scope of the invention.

The first so-called direct acid attack method comprises a first stage of calcination under a stream of dry air, at a temperature of generally between about 450 and 550° C., whose purpose is to eliminate the organic template that is present in the micropores of the zeolite, followed by a treatment stage by an aqueous solution of a mineral acid such as $HNO_3$ or HCL or organic acid such as $CH_3CO_2H$. This last stage can be repeated as many times as are necessary to obtain the desired level of dealuminification. Between these two stages, it is possible to produce one or more ion exchanges by at least one $NH_4NO_3$ solution in order to eliminate at least in part, and preferably virtually completely, the alkaline cation, in particular sodium. Likewise, at the end of the dealuminification treatment by direct acid attack, it is possible to carry out one or more ion exchanges with at least one $NH_4NO_3$ solution to eliminate the residual alkaline cations and in particular sodium.

To attain the desired Si/Al ratio, it is necessary to select the operating conditions well; from this standpoint, the most critical parameters are the temperature of the treatment by the acid aqueous solution, the concentration of the latter, its nature, the ratio between the quantity of acid solution and the treated zeolite mass, the duration of treatment, and the treatment number produced.

The second so-called thermal treatment method (in particular with water vapor or "steaming")+acid attack comprises, in a first step, calcination under a stream of dry air, at a temperature that is generally between about 450 and 550° C., whose purpose is to eliminate the organic template that is occluded in the micropores of the zeolite. Then, the solid that is thus obtained is subjected to one or more ion exchanges by at least one $NH_4NO_3$ solution, to eliminate at least in part, and preferably virtually completely, the alkaline cation, in particular sodium, that is present in the cationic position in the zeolite. The zeolite that is obtained in this way is subjected to at least one skeleton dealuminification cycle that comprises at least one thermal treatment that is carried out, optionally and preferably in the presence of water vapor, at a temperature that is generally between 500 and 900° C. and optionally followed by at least one acid attack by an aqueous solution of a mineral acid or organic acid. The calcination conditions in the presence of water vapor (temperature, water vapor pressure, and duration of treatment) as well as the post-calcination acid attack conditions (duration of the attack, concentration of the acid, nature of the acid that is used, and the ratio between the acid volume and the zeolite mass) are suitable for obtaining the desired dealuminification level. For the same purpose, it is also possible to experiment with varying numbers of acid attack/thermal treatment cycles that are carried out.

In the preferred case where T is Al, the skeleton dealuminification cycle, which comprises at least one thermal treatment stage, optionally carried out and preferably in the presence of water vapor, and at least one acid medium attack stage of the IM-5 zeolite, can be repeated as many times as necessary to obtain the dealuminificated IM-5 zeolite that has the desired characteristics. Likewise, in reference to thermal treatment, which is optionally carried out and preferably in the presence of water vapor, several successive acid attacks, with acid solutions of different concentrations, can be performed.

A variant of this second calcination method can consist in carrying out the thermal treatment of the IM-5 zeolite that contains the organic template, at a temperature that is generally between 500 and 850° C., optionally and preferably in the presence of water vapor. In this case, the calcination stages of the organic template and dealumination structurant of the skeleton are carried out simultaneously. Then, the zeolite is optionally treated with at least one aqueous solution of a mineral acid (for example, HNO3 or HCl) or organic acid ($CH_3CO_2H$, for example). Finally, the solid that is thus obtained can optionally be subjected to at least one ion exchange by at least one $NH_4NO_3$ solution to eliminate virtually any alkaline cation, in particular sodium, that is present in the cationic position in the zeolite.

The IM-5 zeolite according to the invention is, at least in part and preferably virtually completely, in acid form, i.e., in hydrogen form (H+). The atomic ratio Na/T is generally less than 10%, and preferably less than 5%, and even more preferably less than 1%.

The sieve (IM-5 zeolite) generally contains at least one hydro-dehydrogenating element, for example at least one metal of group VIII, preferably a noble metal and advantageously selected from the group that is formed by Pt or Pd, which is introduced into the molecular sieve by, for example, dry impregnation, ion exchange, or any other method that is known to one skilled in the art.

The metal content that is thus introduced, expressed in % by weight relative to the molecular sieve mass that is engaged, is generally less than 5%, preferably less than 3%, and generally on the order of 0.5% to 1% by weight.

In the case of treating an actual feedstock, the molecular sieve according to the invention is preshaped. According to a first variant, the molecular sieve can be subjected to the deposition of at least one metal from group VIII that is preferably selected from the group that is formed by platinum and palladium and shaped by any technique that is known to one skilled in the art. It can in particular be mixed with a matrix, generally amorphous, for example with a wet alumina gel powder. The mixture is then shaped by, for example, extrusion through a die. The molecular sieve content of the mixture that is thus obtained is generally between 0.5 and 99.9% and advantageously between 5 and 90% by weight relative to the mixture (molecular sieve+ matrix).

In the text below, the term substrate will refer to the molecular sieve mixture+matrix.

The shaping can be done with matrices other than alumina, such as, for example, magnesia, amorphous silica-aluminas, natural clays (kaolin, bentonite, sepiolite, attapulgite), silica, titanium oxide, boron oxide, zirconia, aluminum phosphates, titanium phosphates, zirconium phosphates, carbon and their mixtures. Techniques other than extrusion, such as pelletizing or tabletization, can be used.

The hydrogenating metal of group VIII, preferably Pt and/or Pd, can also be deposited on the substrate by any process that is known to one skilled in the art and that makes it possible to deposit the metal on the molecular sieve. It is possible to use the cation exchange technique with competition where the competitor is preferably ammonium nitrate, whereby the competition ratio is at least equal to about 20 and advantageously about 30 to 200. In the case of platinum or palladium, usually a tetramine complex of platinum or a tetramine complex of palladium is used: the latter will then be deposited virtually as a whole on the molecular sieve. This cation exchange technique can also be used to deposit the metal directly on the molecular sieve powder, before it is optionally mixed with a matrix.

The deposition of the metal (or metals) of group VIII is generally followed by calcination under air or oxygen, usually at between 300 and 600° C. over a period of 0.5 to 10 hours, preferably between 350° C. and 550° C. over a period of 1 to 4 hours. It is then possible to initiate reduction under hydrogen, generally at a temperature of between 300 and 600° C. for 1 to 10 hours; preferably the operation will be carried out at between 350° and 550° C. for 2 to 5 hours.

It is also possible to deposit the platinum and/or palladium not directly on the molecular sieve, but rather on the matrix (the aluminum binder), before or after the shaping stage, by anion exchange with hexachloroplatinic acid, hexachloropalladic acid, and/or palladium chloride in the presence of a competing agent, for example hydrochloric acid. In general, after the platinum and/or palladium is deposited, the catalyst is, as above, subjected to calcination and then reduced under hydrogen as indicated above.

The hydro-dehydrogenating element can also be a combination of at least one metal or compound of group VI (for example molybdenum or tungsten) and at least one metal or compound of is group VIII (for example nickel or cobalt). The total concentration of metals of groups VI and VIII, expressed in metal oxides relative to the substrate, is generally between 5 and 40% by weight, and preferably between 7 and 30% by weight. The ratio by weight (expressed in metallic oxides) of metals of group VIII to metals of group VI is preferably between 0.05 and 0.8; and preferably between 0.13 and 0.5.

The above-indicated preparation methods can be used for depositing these metals.

This type of catalyst can advantageously contain phosphorus, whose content, expressed in phosphorus oxide $P_2O_5$ relative to the substrate, will generally be less than 15% by weight, and preferably less than 10% by weight.

The feedstocks that can be treated according to the process of the invention are advantageously fractions that have pour points that are relatively high and whose values it is desirable to lower.

The process according to the invention can be used to treat the varied feedstocks, ranging from relatively light fractions, such as kerosenes and jet fuels to feedstocks that have higher boiling points such as middle distillates, residues under vacuum, gas-oils, middle distillates that come from FCC Fluid Catalytic Cracking (LCO Light Cycle Oil and HCO Heavy Cycle Oil) and hydrocracking residues, or else waxes, such as "slack waxes," which are dewaxed hydrocracking residues.

In the majority of cases, the feedstock to be treated is a fraction $C_{10}+$ with a starting boiling point that is greater than about 175° C., preferably a heavy fraction with a boiling point of at least 280° C. and advantageously with a boiling point of at least 380° C. The process according to the invention is particularly suitable for treating paraffinic distillates such as the middle distillates that include gas-oils, kerosenes, jet fuels, distillates under vacuum, and any other fraction whose pour point and viscosity should be suitable for falling within the scope of the specifications.

The feedstocks that can be treated according to the process of the invention can contain paraffins, olefins, naphthenes, aromatic compounds, and also heterocycles and with a large ratio of n-paraffins of high molecular weight and very slightly branched paraffins that also have a high molecular weight.

Typical feedstocks that can be advantageously treated according to the invention generally have a pour point above 0° C. The products that result from the treatment according to the process have pour points that are below 0° C. and preferably below about −100° C.

These feedstocks may have n-paraffin contents with more than 10 carbon atoms of high molecular weight and paraffins with more than 10 carbon atoms that are very slightly branched and also with high molecular weight, greater than 30% and up to about 90%, even, in some cases, greater than 90% by weight. The process is particularly advantageous when this ratio is at least 60% by weight.

It is possible to cite, as examples of other feedstocks that can be treated according to the invention and in a nonlimiting way, bases for lubricating oils, synthesis paraffins that come from the Fischer-Tropsch process, polyalphaolefins with a high pour point, synthesis oils, etc. . . . The process can also be applied to other compounds that contain an n-alkane chain as defined above, for example n-alkylcycloalkane compounds, or that comprise at least one aromatic group.

The operating conditions under which the process of the invention is carried out are as follows:
the reaction temperature is between 170 and 500° C. and preferably between 180 and 470° C., advantageously 190–450° C.;
the pressure is between 1 and 250 bar and preferably between 10 and 200 bar;
the hourly volume velocity (vvh expressed by volume of feedstock that is injected by volume unit of catalyst and per hour) is between about 0.05 and about 100 and preferably between about 0.1 and about 30 $h^{-1}$.
The contact between the feedstock and the catalyst is carried out in the presence of hydrogen. The hydrogen level that is used, expressed in liters of hydrogen per liter of feedstock, is between 50 and about 2000 liters of hydrogen per liter of feedstock and preferably between 100 and 1500 liters of hydrogen per liter of feedstock.

The feedstock that is to be treated preferably has a content of nitrogenous compounds that is less than about 200 ppm by weight and preferably less than 100 ppm by weight. The sulfur content is less than 1000 ppm by weight, preferably less than 500 ppm, and even more preferably less than 200 ppm by weight. The metal content of the feedstock, such as Ni or V, is extremely low, i.e., less than 50 ppm by weight, preferably less than 10 ppm by weight, and even more preferably less than 2 ppm by weight.

The following examples illustrate the invention without, however, limiting its scope.

EXAMPLE 1

Synthesis of the IN-5 zeolite with pentane-1,5-bis (methylpyrrolidinium) bromide (PentPyrr). The structure of the pentane-1,5-bis(methylpyrrolidinium) bromide is as follows:

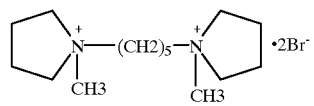

38 g of water is poured into a solid mixture that contains 3.6 g of Aerosil 130 silica, 4.08 g of PentPyrr, and 0.144 g of calcined zeolite NU-88 nuclei (obtained by grinding a sample from a preceding synthesis). It is stirred until a homogeneous mixture is obtained, then a solution that is obtained by dissolving 0.32 g of Carlo Erba sodium aluminate (54% $Al_2O_3$, 37% $Na_2O$), still while being stirred, and 1.22 g of soda (NaOH) in 20 g of water are added. This gel is stirred for 15 minutes before being transferred into an autoclave that is equipped with a PTFE (polytetrafluoroethylene) lining.

The molar composition of the gel corresponds to:
60 $SiO_2$, 1.70 $Al_2O_3$, 18 $Na_2O$, 10 PentPyrr, 3000 $H_2O$.

The autoclave is heated for 8 days at 170° C. in a drying oven under static conditions. After filtration, $H_2O$ washing and drying at 60° C., 2.95 g of product is obtained.

The analysis of Si, Al and Na in the product was done by atomic emission spectroscopy. The following atomic composition was found:

100 $SiO_2$: 4.0 $Al_2O_3$: 0.144 $Na_2O$

Figure 1:
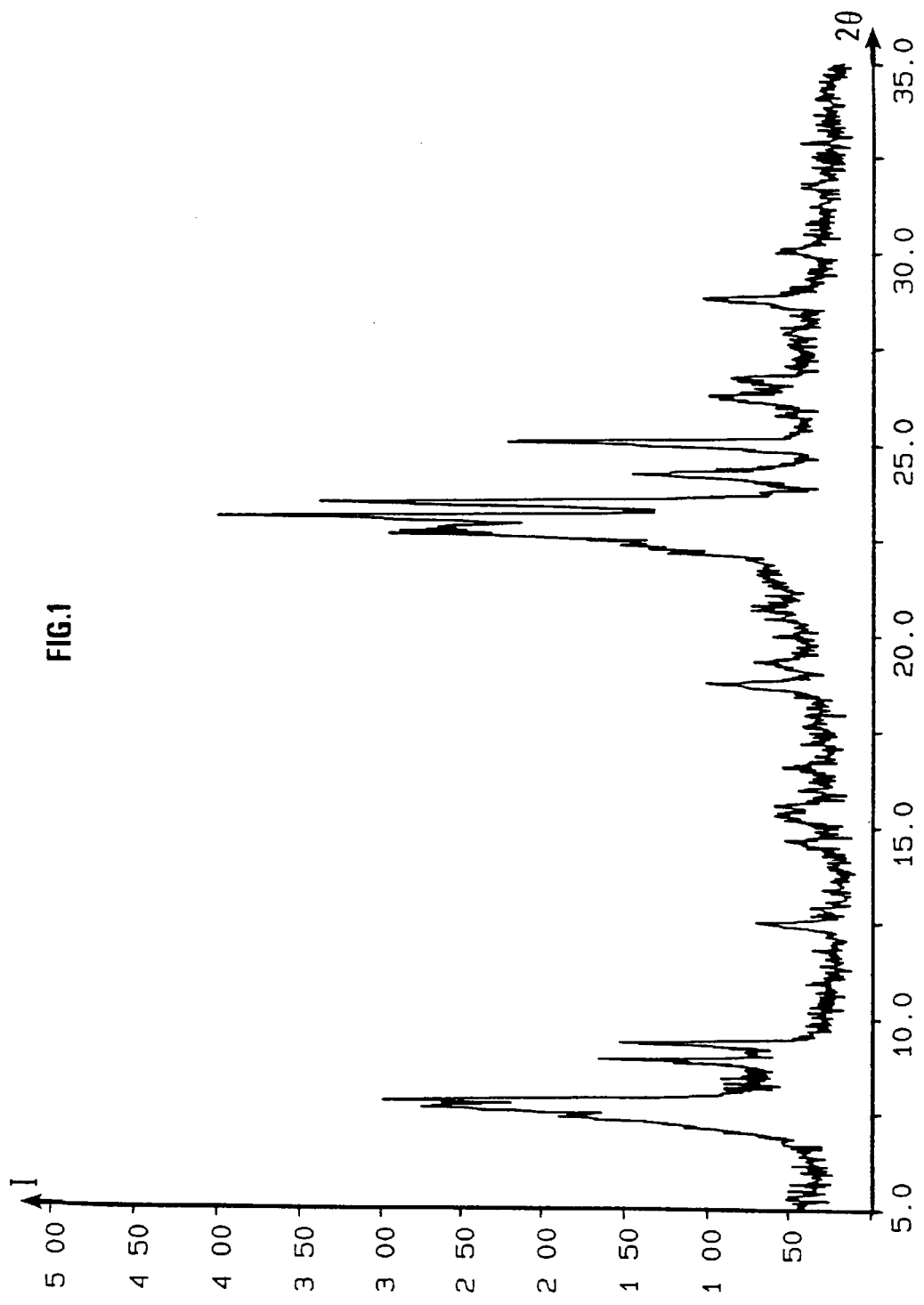
FIGS. 1 and 2 are diffractograms which are further explained in Example 1.

The dried solid product was analyzed by X-ray powder diffraction and identified as consisting of the IM-5 zeolite; the diagram that is obtained is consistent with the results that are presented in Table 1. The diffractogram is provided in FIG. 1 [on the ordinate is intensity 1 (random unit) and on the abscissa is 2 (Cu K alpha)].

Figure 2:
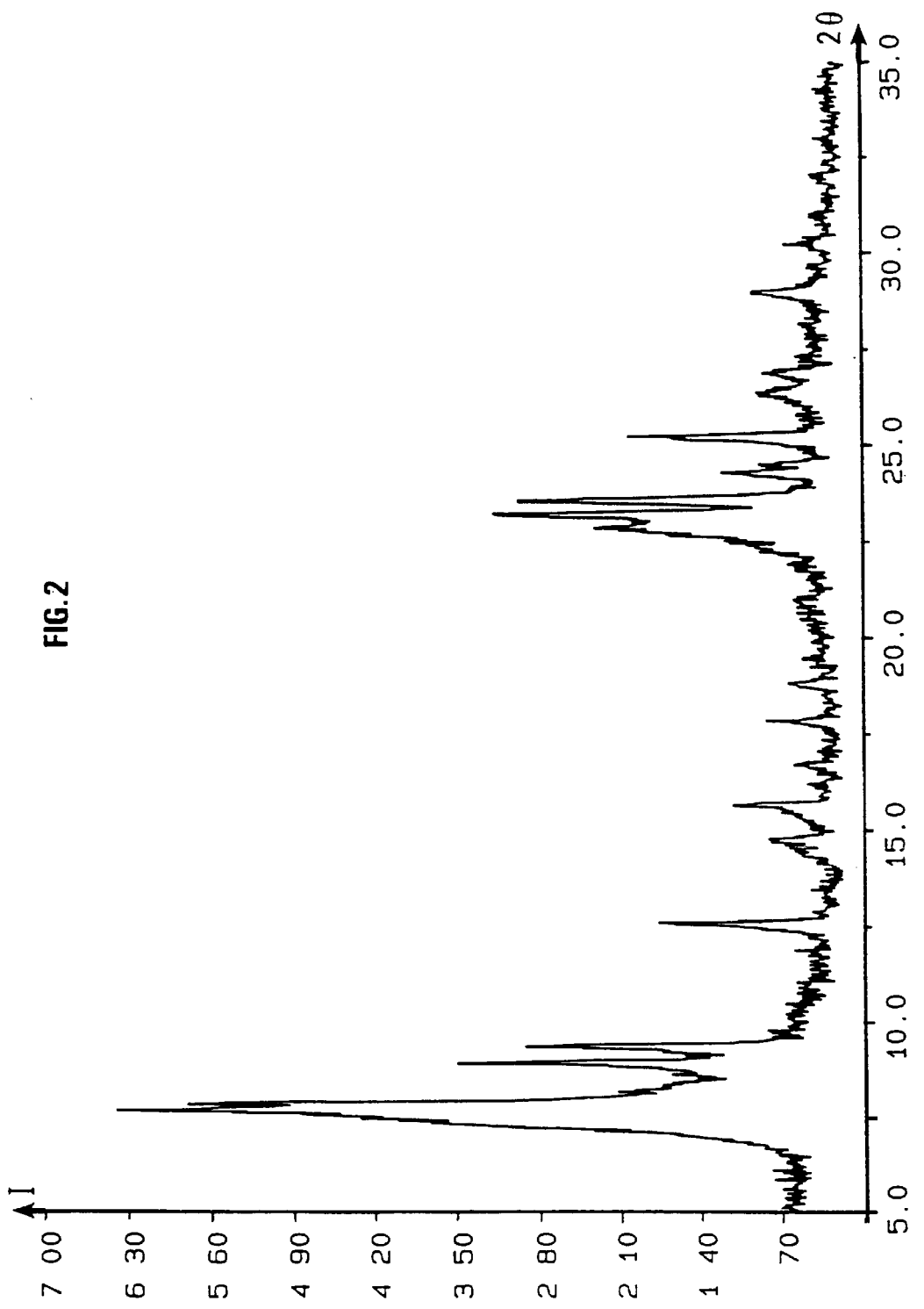

The specific surface area of product the IM-5 was determined after calcination at 550° C. under dry air for 4 hours and is found to be equal to 530 $m^2/g$. Product H-IM5 that is obtained has a diffractogram that is presented in FIG. 2 (on the ordinate is intensity 1 (random unit) and on the abscissa is 2 (Cu K alpha)].

The entire sample of coarse IM-5 synthesis zeolite first undergoes so-called dry calcination at 550° C. under a stream of dry air for 8 hours. Then the solid that is obtained is subjected to four ion exchanges in a 10N NH$_4$NO$_3$ solution, at about 100° C. for 4 hours for each exchange. The solid that is thus obtained is referenced as NH$_4$-IM-5/1 and has an Sl/Al=12.9 ratio and an Na/Al=0.005 ratio.

Then, zeolite NH4-IM-5/1 is mixed with the alumina of type SB3 that is supplied by the Condea Company. The mixed paste is then extruded through a die with a 1.4 mm diameter. The extrudates are then calcined at 500° C. for 2 hours under air, then impregnated dry with a tetramine platinum chloride solution [Pt(NH$_3$)$_4$]Cl$_2$, and finally calcined under air at 550° C. The platinum content of final catalyst C1 that is thus obtained is 0.7% by weight, and the zeolite content, expressed relative to the entire solid mass of the catalyst, is 20% by weight.

EXAMPLE 2

Preparation of Catalyst C2 According to the Invention

The raw material that is used in this example is the same IM-5 zeolite as the one that is prepared in Example 1. It is also subjected to treatment with a 5N nitric acid solution, at about 100° C., for 7 hours. Volume V of the nitric acid solution that is engaged (in ml) is equal to 10 times the weight P of dry IM-5 zeolite (V/P=10). This treatment is carried out a second time under the same operating conditions.

At the end of these treatments, the zeolite that is obtained and referenced as IM-5/2 has an overall atomic Sl/Al ratio that is equal to 38 and an atomic Na/Al ratio that is less than 0.001.

Then, the IM-5/2 zeolite is mixed with the alumina of type SB3 that is supplied by the Condéa Company. The mixed paste is then extruded through a die with a diameter of 1.4 mm. The extrudates are then calcined at 500° C. for 2 hours under air, then impregnated dry with a tetramine platinum chloride solution [Pt(NH$_3$)$_4$]Cl$_2$, and finally calcined under air at 550° C. The platinum content of final catalyst C1 that is thus obtained is 0.7% by weight, and the zeolite content, expressed relative to the entire solid mass of the catalyst, is 20% by weight.

EXAMPLE 3

Evaluation of Catalysts C1 and C2 on a Hydrocracking Residue

Catalysts C1 and C2 were evaluated for treating a hydrocracking residue that comes from a distillate under vacuum. The characteristics of this feedstock are as follows:

| | |
|---|---|
| Sulfur content (ppm by weight) | 10 |
| Nitrogen content (ppm by weight) | 1 |
| Pour point (° C.) | +40 |
| Starting point | 281 |
| 10% | 345 |
| 50% | 412 |
| 90% | 470 |
| End point | 543 |

Catalysts C1 and C2, whose preparation is described in, respectively, Examples 1 and 2, are used to prepare a basic oil from the feedstock that is described above.

The catalyst is first reduced under hydrogen at 450° C. before the in situ catalytic test in the reactor. This reduction is carried out in stages. It consists of one stage at 150° C. for 2 hours, then a rise in temperature up to 450° C. at a rate of 1° C./min, and then a stage of 2 hours at 450° C. During this reduction procedure, the hydrogen flow is 1000 liters of H$_2$ per liter of catalyst.

In the case of catalyst C1, the reaction took place at 275° C., under a total pressure of 12 MPa, an hourly volume speed of 1 h$^{-1}$, and a hydrogen flow of 1000 liters of H$_2$ per liter of feedstock. In the case of catalyst C2, the reaction took place at 285° C., whereby the other operating conditions were otherwise identical to those used for testing catalyst C2.

The characteristics of the oil that is obtained are recorded in the table below.

| | Catalyst C1 | Catalyst C2 |
|---|---|---|
| Vicscosity index VI | 121 | 126 |
| Pour point | −11° C. | −13° C. |
| Oil yield (% by weight) | 71 | 74 |

These examples show that there is every advantage in using catalysts according to the invention, which make it possible to lower the pour point of the initial feedstock, in this case a hydrocracking residue, while preserving a high viscosity index (VI).

The preceding examples can be repeated with similar success by substituting the generically or specifically described reactants and/or operating conditions of this invention for those used in the preceding examples.

The entire disclosure of all applications, patents and publications, cited above, and of corresponding French application No. 97/12.944, are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

We claim:

1. A process for improving the pour point of a feedstock that comprises paraffins with more than 10 carbon atoms, in which the feedstock that is to be treated is brought into contact with a catalyst with an IM-5 zeolite base and at least one hydro-dehydrogenating element, at a temperature of between 170 and 500° C., a pressure of between 1 and 250 bar, and an hourly volume velocity of between 0.05 and 100 h$^{-1}$, in the presence of hydrogen at a ratio of 50 to 2000 l/l of feedstock.

2. A process according to claim 1, in which the hydro-dehydrogenating element belongs to group VIII.

3. A process according to claim 1, in which the hydro-dehydrogenating element is a combination of at least one metal or a compound of group VI and at least one metal or a compound of group VIII.

4. A process according to claim 1, in which the IM-5 zeolite has an atomic Si/T ratio of between 5 and 600, whereby T is Al, Fe, Ga, B, Ti, or Zr.

5. A process according to claim 4, in which at least a portion of element T of the zeolite has been removed, whereby T is Al, Fe, Ga, B, Ti, or Zr.

6. A process according to one claim 1 in which the zeolite has been dealuminated.

7. A process according to claim 1 in which the feedstock has a starting boiling point that is greater than 175° C.

8. A process according to claim 1 in which the feedstock has a starting boiling point of at least 280° C.

9. A process according to claim 1, in which the feedstock has a starting boiling point of at least 380° C.

10. A process according to claim 5, in which the feedstock contains paraffins that have 15 to 50 carbon atoms.

11. A process according to claim 1, in which the feedstock contains paraffins that have 15 to 40 carbon atoms.

12. A process according to claim 1, in which the compound that is to be treated is present in a feedstock that contains hydrocarbon which is selected from the group consisting of middle distillates, gas-oils, the residues under vacuum, hydrocracking residues, the paraffins that come from the Fischer-Tropsch process, synthesis oils, the gas-oil fractions and middle distillates that come from FCC, oils, polyalphaolefins, and waxes.

13. A process according to claim 1, in which the zeolite content in the catalyst is between 0.5 and 99.9% by weight.

14. A process according to claim 1, in which the catalyst contains at least one matrix that is selected from among the elements of the group consisting of clays, magnesia, alumina, silica, titanium oxide, boron oxide, zirconia, aluminum phosphates, titanium phosphates, zirconium phosphates and silica-aluminas and carbon.

* * * * *